(12) United States Patent
Park et al.

(10) Patent No.: US 9,505,445 B2
(45) Date of Patent: Nov. 29, 2016

(54) CARRIER FOR MOTOR VEHICLE

(71) Applicant: Hanon Systems, Daejeon (KR)

(72) Inventors: Sung-Wook Park, Daejeon (KR); Won Sub So, Daejeon (KR); Ok Ryul Min, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 14/865,221

(22) Filed: Sep. 25, 2015

(65) Prior Publication Data
US 2016/0090127 A1   Mar. 31, 2016

(30) Foreign Application Priority Data

Sep. 25, 2014  (KR) .................. 10-2014-0128050
Jan. 21, 2015  (KR) .................. 10-2015-0010044

(51) Int. Cl.
| B62D 27/00 | (2006.01) |
| B62D 25/08 | (2006.01) |
| B62D 27/02 | (2006.01) |
| B60R 19/24 | (2006.01) |
| B60Q 1/04 | (2006.01) |

(52) U.S. Cl.
CPC ........... *B62D 25/085* (2013.01); *B60Q 1/0408* (2013.01); *B60R 19/24* (2013.01); *B62D 27/023* (2013.01)

(58) Field of Classification Search
CPC .. B62D 25/085; B62D 27/023; B60R 19/24; B60Q 1/0408
USPC ............................ 296/193.09, 193.1, 187.09
See application file for complete search history.

(56) References Cited

U.S. PATENT DOCUMENTS

| 2004/0080183 A1* | 4/2004 | Andre ................... B62D 65/04 |
| | | 296/193.04 |
| 2007/0182211 A1* | 8/2007 | Sub ..................... B62D 25/084 |
| | | 296/193.09 |

* cited by examiner

*Primary Examiner* — Joseph D Pape
(74) *Attorney, Agent, or Firm* — Fraser Clemens Martin & Miller LLC; James D. Miller

(57) ABSTRACT

Provided is a carrier for a vehicle of which a replacement cost is minimized at the time of collision of the vehicle at a low speed by configuring head lamp mounting parts of the carrier in which head lamps are to be mounted in a separable form and allowing the head lamp mounting parts to be coupled through both ends of a bumper beam coupled to the carrier.

17 Claims, 10 Drawing Sheets

CARRIER FOR MOTOR VEHICLE

CROSS-REFERENCE TO RELATED APPLICATIONS

This application claims priority under 35 U.S.C. §119 to Korean Patent Application No. 10-2014-0128050 filed on Sep. 25, 2014 and 10-2015-0010044 filed on Jan. 21, 2015, in the Korean Intellectual Property Office, the disclosures of which are incorporated herein by reference in their entirety.

FIELD

The following disclosure relates to a carrier for a vehicle, and more particularly, to a carrier for a vehicle of which a replacement cost is minimized at the time of collision of the vehicle at a low speed by configuring head lamp mounting parts of the carrier in which head lamps are to be mounted in a separable form and allowing the head lamp mounting parts to be coupled through both ends of a bumper beam coupled to the carrier.

BACKGROUND

Recently, in an assembling process of a vehicle, a technology of assembling an assembly in which a plurality of components are assembled on an assembling line, that is, a modularizing technology has been suggested in order to simplify and automate the process and improve productivity.

A type example of the modularizing technology includes a front end module modularized by assembling a bumper including a cooling module, head lamps, and a bumper beam.

The front end module is modularized by mounting a cooling module including a radiator, a condenser, and a fan shroud at a cooling module mounting part of a carrier disposed on the center of the front end module, mounting the head lamps at head lamp mounting parts of the carrier, and mounting the bumper beam on a front surface of the carrier.

As described above, components disposed at the front of the vehicle are assembled to each other to thereby be modularized, such that the assembling process is simplified, thereby improving productivity.

FIG. 1 is a perspective view of a carrier for a vehicle according to the related art, and FIG. 2 is a perspective view of the carrier according to the related art in which head lamps are mounted.

Referring to FIGS. 1 and 2, the carrier C is configured to include a front panel 50 including an upper horizontal support part 10, a lower horizontal support part 20 disposed in parallel with the upper horizontal support part 10 below the upper horizontal support part 10, and left and right vertical support parts 30 and 40 connecting the upper horizontal support part 10 and the lower horizontal support part 20 to each other to thereby be provided with a cooling module mounting part and having an approximately quadrangular frame shape; and support panels 60 formed at the left and the right of the front panel 50 so as to be extended from the front panel 50 and formed in order to mount head lamps 80.

Here, the support panel 60 is divided into a lower frame 61 to which a lower end of the head lamp 80 is fixed and an upper frame 62 to which an upper end of the head lamp 80 is fixed. However, in the case in which impact is applied to the head lamp 80 at the time of front collision of the vehicle, the impact is transferred to the front panel 50 through the support panel 60 as it is, such that the carrier C is damaged and a heat exchange module (an assembly of a radiator, a condenser, and a fan shroud) mounted in the carrier C is further damaged. As a result, a repairing cost is increased.

In addition, bumper beam coupling parts for coupling a bumper beam (not illustrated) should be formed at the left and right support parts 30 and 40 at which the lower frames 61 are formed. Therefore, the bumper beam coupling parts and structures for reinforcing strength of the support panels 60 are added, such that a shape becomes complicated. As a result, a manufacturing cost is increased, and the possibility that deformation will be generated at the time of injection-molding the carrier is increased, and fuel efficiency performance of the vehicle is deteriorated due to an increase in a weight.

SUMMARY

An embodiment of the present invention is directed to providing a carrier for a vehicle to which damage at the time of front impact of the vehicle is minimized by separately including support panels in which head lamps on the carrier are mounted and allowing the support panels to be coupled through both ends of a bumper beam coupled to a front panel rather than being coupled to the front panel.

In addition, an embodiment of the present invention is directed to providing a carrier for a vehicle of which a structure is simplified by removing structures for reinforcing strength of support panels from a front panel since the support panels are coupled through a bumper beam.

Particularly, an embodiment of the present invention is directed to providing a carrier for a vehicle in which assembling quality of support panels is improved by coupling the support panels to bumper beam stays formed in front and rear directions of the vehicle.

In one general aspect, a carrier 100 or 300 for a vehicle includes: a front panel 110 or 310 including an upper horizontal support part 121 or 321, a lower horizontal support part 122 or 322, and left and right vertical support parts 123 and 124 or 323 and 324 connecting the upper and lower horizontal support parts 121 and 122 or 321 and 322 to each other to thereby be provided with a cooling module mounting part 125 or 325 and having a quadrangular shape; support panels 130 or 330 disposed at the left and the right of the front panel 110 or 310 in order to mount head lamps 200; and a bumper beam 160 or 360 having both ends coupled to the left and right vertical support parts 123 and 124 or 323 and 324, wherein the support panels 130 or 330 are separately disposed at the left and the right of the front panel 110 or 310 and are coupled and fixed to both ends of the bumper beam 160 or 360, respectively.

The carrier for a vehicle may further include bumper beam brackets 150 or 350 provided in order to couple both ends of the bumper beam 160 or 360 to the left and right vertical support parts 123 and 124 or 323 and 324, respectively, wherein the support panels 130 or 330 are coupled and fixed to the bumper beam brackets 150 or 350, respectively.

The bumper beam brackets 150 may include: bumper beam plates 151 formed in a width direction of the vehicle and having inner sides in the width direction of the vehicle fixed to the left vertical support part 123 or the right vertical support part 124; and bumper beam stays 152 extended from a vehicle front surface of the bumper beam plates 151 toward the front of the vehicle so that both ends of the bumper beam 160 are fixed thereto, and the support panels 130 may be coupled and fixed to rear surfaces of the bumper beam plates 151.

The support panels 130 may be coupled and fixed through the bumper beam plates 151 so as to be spaced apart from the left vertical support part 123 and the right vertical support part 124 outwardly in the width direction of the vehicle by a predetermined distance.

The bumper beam plate 151 may include first coupling parts 151a formed at an inner side thereof in the width direction of the vehicle and coupled to the left vertical support part 123 or the right vertical support part 124, and the bumper beam plate 151 may include second coupling parts 151b formed at an outer side thereof in the width direction of the vehicle so as to be coupled to the support panel 130.

The second coupling parts 151b may be formed of holes for bolt or screw coupling, and a plurality of second coupling parts 151b may be formed to be spaced apart from each other in a vertical length direction.

The left vertical support part 123 and the right vertical support part 124 may include first bumper beam plate coupling parts 124a formed at outer sides thereof in the width direction of the vehicle so as to be coupled to the first coupling parts 151a.

The bumper beam brackets 350 may include: bumper beam plates 351 formed in a width direction of the vehicle and having inner sides in the width direction of the vehicle fixed to the left vertical support part 323 or the right vertical support part 324; and bumper beam stays 352 extended from a vehicle front surface of the bumper beam plates 351 toward the front of the vehicle so that both ends of the bumper beam 360 are fixed thereto, and the support panels 330 may be coupled and fixed to outer side surfaces of the bumper beam stays 352 in the width direction of the vehicle.

The support panels 330 may be coupled and fixed through the bumper beam brackets 350 so as to be spaced apart from the left vertical support part 323 and the right vertical support part 324 outwardly in the width direction of the vehicle by a predetermined distance.

The bumper beam brackets 350 may include: the bumper beam plates 351 formed in the width direction of the vehicle and including first coupling parts 351a formed at an inner side thereof in the width direction of the vehicle and coupled to the left vertical support part 323 or the right vertical support part 324; and the bumper beam stays 352 extended from the bumper beam plates 351 toward the front of the vehicle so as to be coupled to both ends of the bumper beam 360, and the bumper beam stays 352 may include second coupling parts 352a formed at an outer side thereof in the width direction of the vehicle so as to be coupled to the support panels 330.

The second coupling parts 352a may be formed of holes for bolt or screw coupling, and a plurality of second coupling parts 352a may be formed to be spaced apart from each other in a vertical length direction.

The support panel 330 may include: a head lamp mounting part 331 formed at an outer side thereof in the width direction of the vehicle in order to mount the head lamp; and a bracket coupling part 332 formed at an inner side thereof in the width direction of the vehicle so as to be coupled to the bumper beam bracket 350, and the bracket coupling part 332 may include bumper beam stay coupling parts 332a formed at an inner side thereof in the width direction of the vehicle so as to be screw or bolt-coupled to the second coupling parts 352a.

A vehicle rear surface of the bracket coupling part 332 may contact a vehicle front surface of the bumper beam plate 351.

[Detailed Description of Main Elements]

| | |
|---|---|
| 100: carrier | |
| 110: front panel | 121: upper horizontal support part |
| 122: lower horizontal support part | 123: left vertical support part |
| 124: right vertical support part | 124a: first bumper beam plate coupling part |
| 125: cooling module mounting part | |
| 130: support panel | 131: second bumper beam plate coupling part |
| 150: bumper beam bracket | 151: bumper beam plate |
| 152: bumper beam stay | |
| 160: bumper beam | |
| 151a: first coupling part | 151b: second coupling part |
| 200: head lamp | |
| 300: carrier | |
| 310: front panel | 321: upper horizontal support part |
| 322: lower horizontal support part | 323: left vertical support part |
| 324: right vertical support part | |
| 330: support panel | 331: head lamp mounting part |
| 332: bracket coupling part | |
| 350: bumper beam bracket | 351: bumper beam plate |
| 352: bumper beam stay | |
| 360: bumper beam | |

DETAILED DESCRIPTION OF EMBODIMENTS

First Exemplary Embodiment

Hereinafter, a carrier for a vehicle according to a first exemplary embodiment of the present invention will be described in detail with reference to the accompanying drawings.

Figure 1:
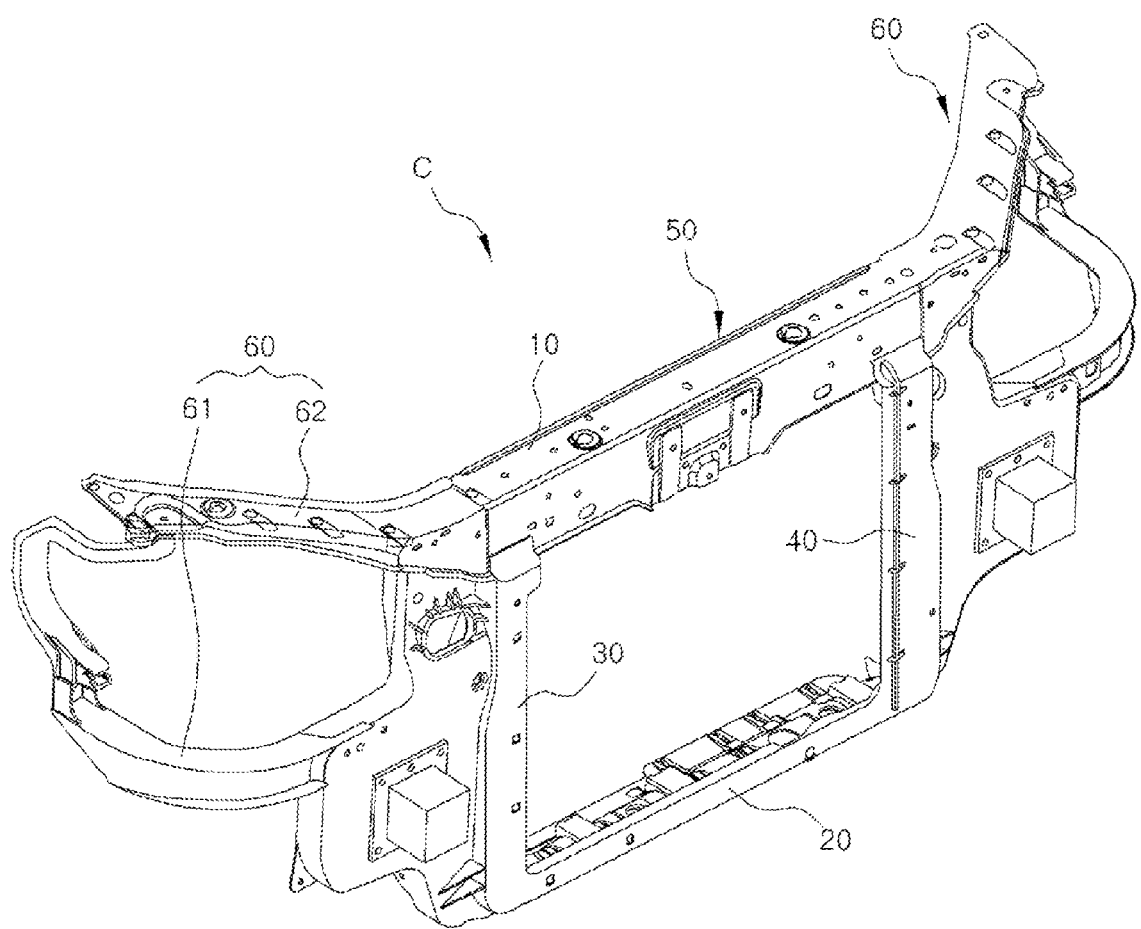
FIG. 1 is a perspective view of a carrier for a vehicle according to the related art.
Figure 2:
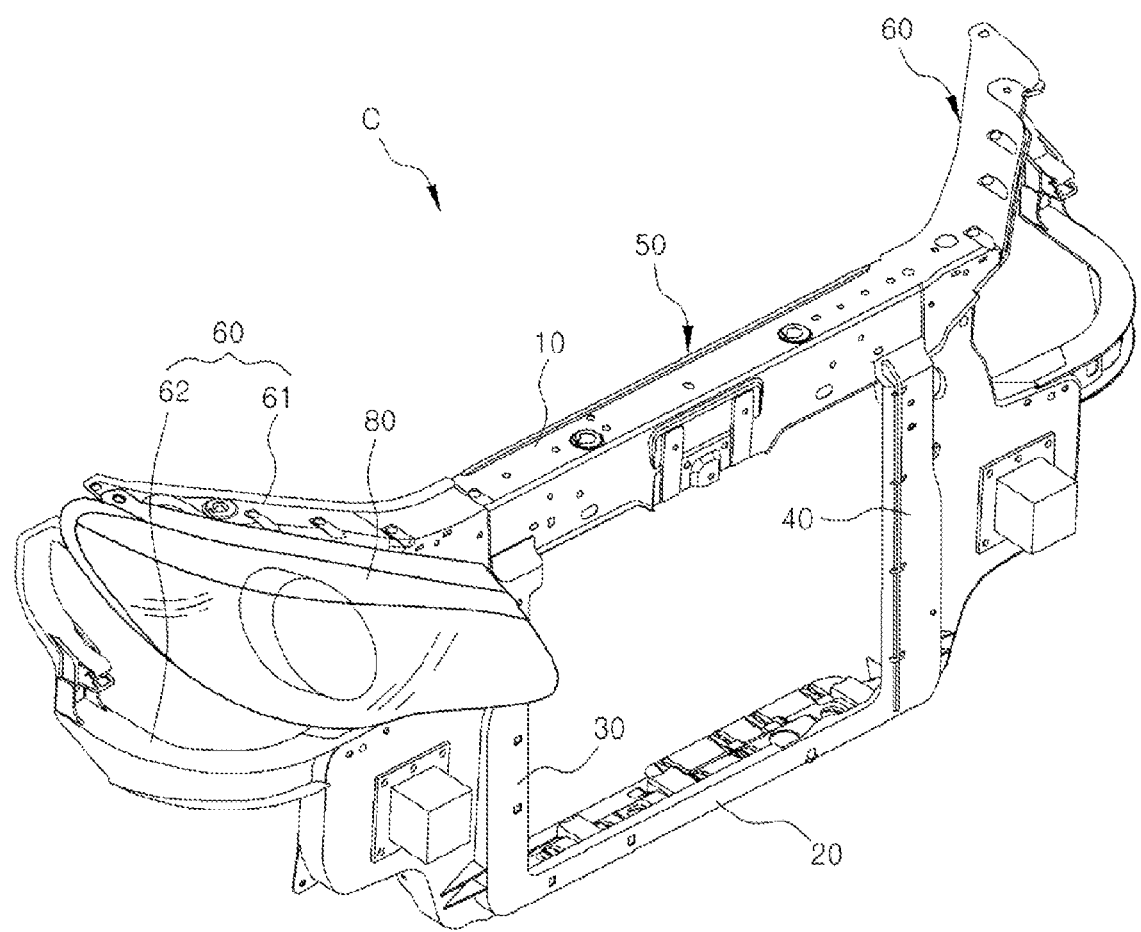
FIG. 2 is a perspective view of the carrier according to the related art in which head lamps are mounted.
Figure 3:
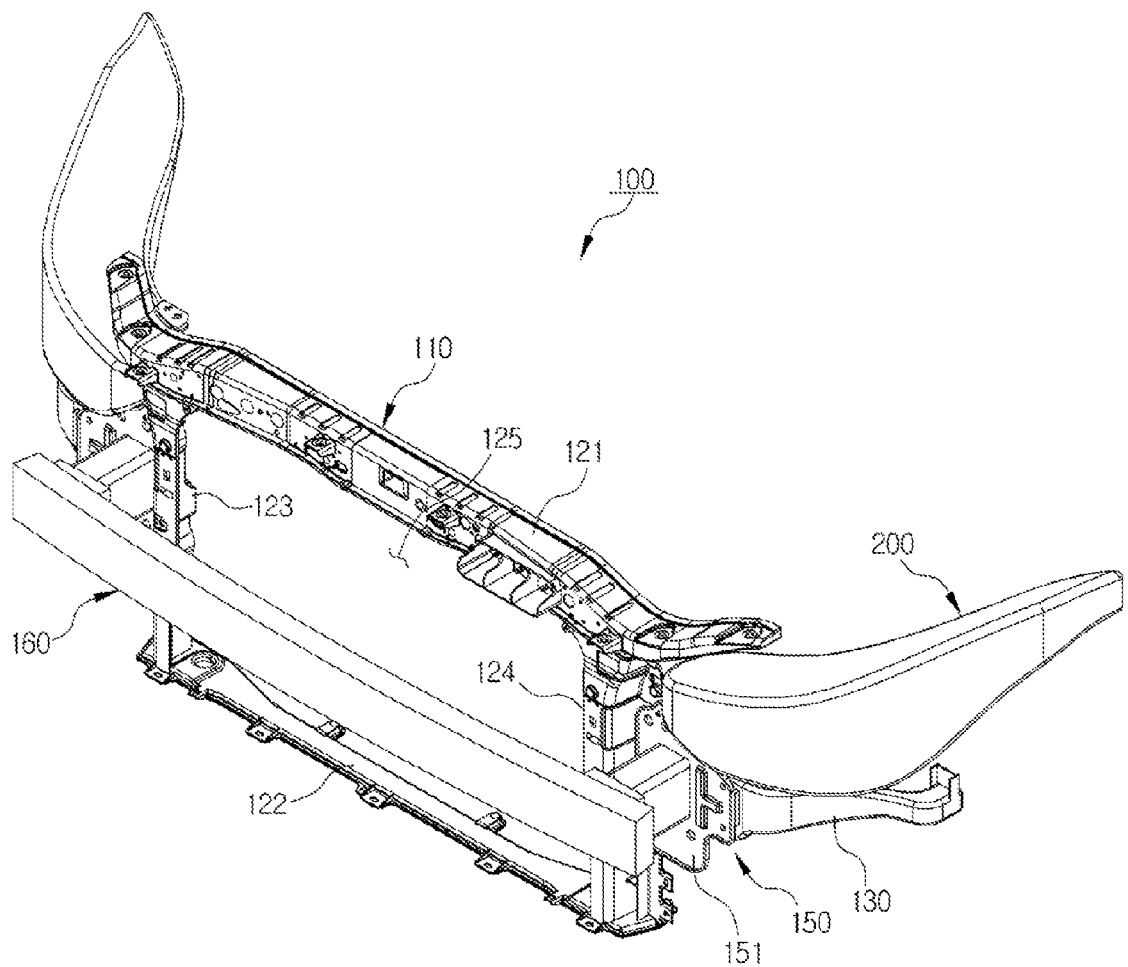
FIG. 3 is a perspective view of a carrier for a vehicle according to a first exemplary embodiment of the present invention in which head lamps are mounted.
Figure 4:
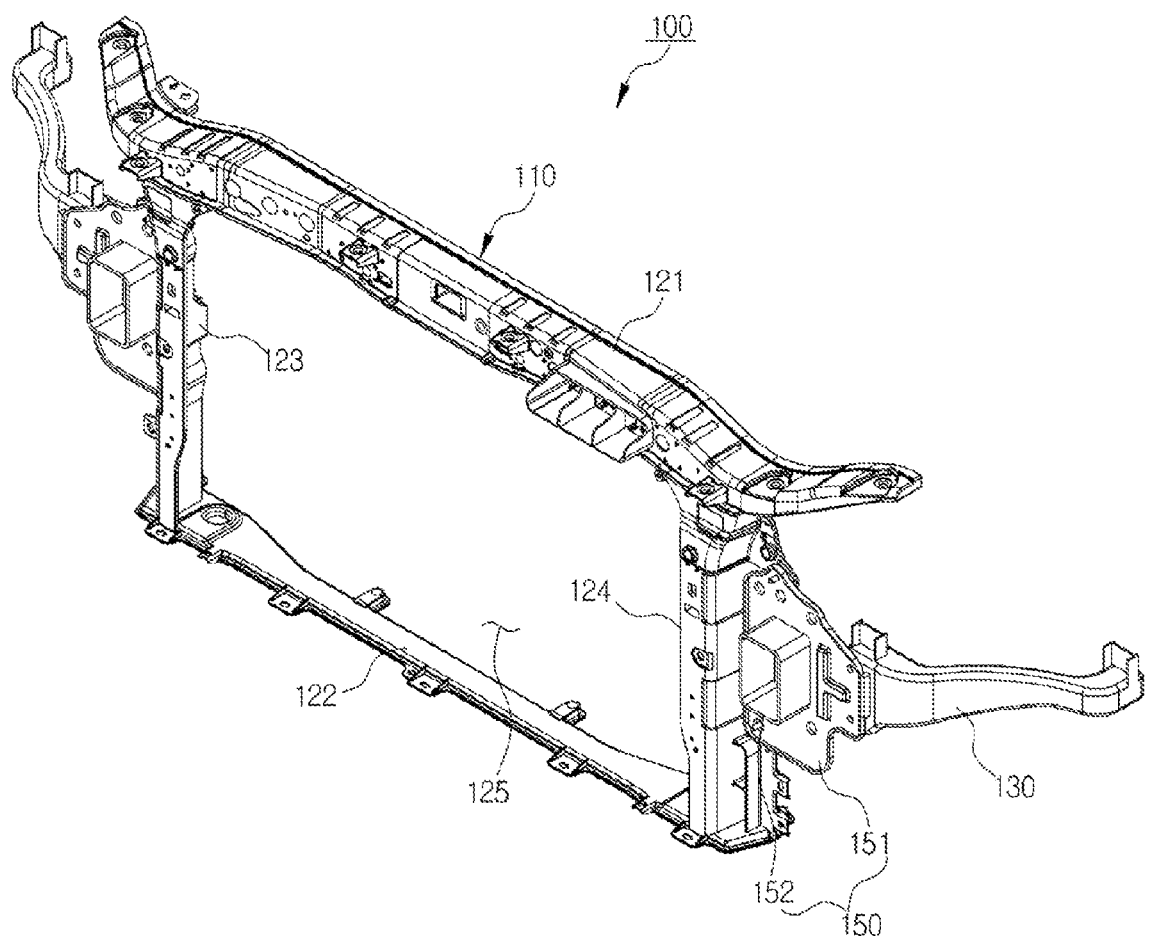
FIG. 4 is a perspective view of the carrier for a vehicle according to a first exemplary embodiment of the present invention from which a bumper beam is removed.

In FIG. 3, an entire perspective view of a carrier 100 for a vehicle according to a first exemplary embodiment of the present invention in which head lamps 200 are mounted is illustrated, and in FIG. 4, an entire perspective view of the carrier 100 for a vehicle according to a first exemplary embodiment of the present invention from which a bumper beam 160 is removed is illustrated.

As illustrated in FIGS. 3 and 4, the carrier 100 for a vehicle according to a first exemplary embodiment of the present invention is configured to include a front panel 110 including an upper horizontal support part 121, a lower horizontal support part 122 disposed in parallel with the upper horizontal support part 121 below the upper horizontal support part 121, and left and right vertical support parts 123 and 124 connecting the upper horizontal support part 121 and the lower horizontal support part 122 to each other to thereby be provided with a cooling module mounting part 125 and having an approximately quadrangular frame shape; support panels 130 disposed at the left and the right of the front panel 110 in order to mount head lamps 200; a bumper beam 160 disposed in front of the front panel 110 so as to transverse in a width direction of the vehicle; and bumper beam brackets 150 disposed at the left and the right of the front panel 110 and formed in order to mount the bumper beam 160.

The support panels are generally formed to enclose circumferences of the head lamps. However, in accordance with the trend toward gradual miniaturization and lightness of the carrier, the support panels 130 of the carrier 100 for a vehicle according to a first exemplary embodiment of the present invention are configured to support only lower portions of the head lamps 200, and upper portions of the head lamps 200 are supported through upper head lamp fixing parts (not illustrated) extended from both ends of the upper horizontal support part 121 outwardly in the width direction of the vehicle.

Here, in the case in which impact is applied to the head lamp at the time of front collision of the vehicle, the case in which the impact is transferred to the front panel 110 through the support panel 130 to damage the front panel 110 occurs. Therefore, even though only the support panel 130 is damaged, the support panel 130 and the front panel 110 are formed integrally with each other in many cases, such that the entire carrier 100 needs to be replaced, which is a burden. In consideration of this point, the carrier 100 for a vehicle according to a first exemplary embodiment of the present invention has the following characteristic configurations.

Figure 5:
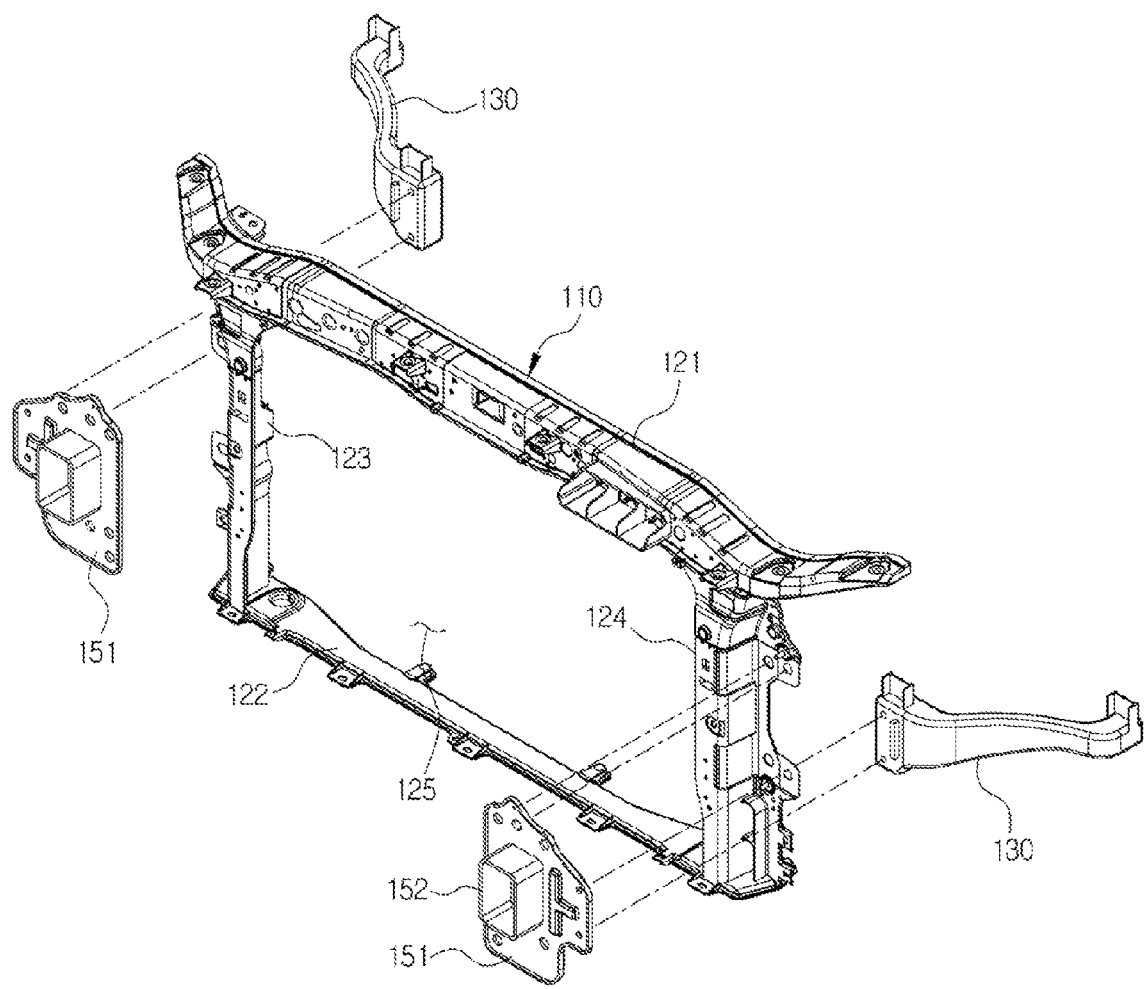
FIG. 5 is an exploded perspective view of the carrier for a vehicle according to a first exemplary embodiment of the present invention.

In FIG. 5, an exploded perspective view of the carrier 100 for a vehicle according to a first exemplary embodiment of the present invention is illustrated.

As illustrated in FIG. 5, the support panels 130 may be provided at an outer side of the left vertical support part 123 in the width direction of the vehicle and an outer side of the right vertical support part 124 in the width direction of the vehicle, respectively. Here, the support panels 130 are not formed integrally with the left vertical support part 123 or the right vertical support part 124, but may be formed separately from the left vertical support part 123 or the right vertical support part 124. In addition, the support panels 130 are not coupled directly to the left vertical support part 123 or the right vertical support part 124, but may be coupled and fixed to the left vertical support part 123 or the right vertical support part 124 through the bumper beam brackets 150 each coupled to the left vertical support part 123 and the right vertical support part 124 in order to couple the bumper beam 160 (see FIG. 3) to the front panel 110.

Here, the bumper beam brackets 150 include bumper beam plates 151 formed in the width direction of the vehicle and having inner sides in the width direction of the vehicle fixed to the left vertical support part 123 or the right vertical support part 124 and bumper beam stays 152 extended from a vehicle front surface of the bumper beam plates 151 toward the front of the vehicle so that both ends of the bumper beam 160 are fixed thereto and having a beam shape.

That is, the inner side of the bumper beam plate 151 in the width direction of the vehicle may be coupled and fixed to an outer side of the left vertical support part 123 or the right vertical support part 124 in the width direction of the vehicle, and an inner side of the support panel 130 in the width direction of the vehicle may be coupled and fixed to an outer side of the bumper beam plate 151 in the width direction of the vehicle.

Therefore, the impact applied to the support panel 130 is absorbed through the bumper beam plate 151, such that it is not transferred directly to the left vertical support part 123 or the right vertical support part 124, thereby minimizing damage to the front panel 110, and even though the impact is applied to the support panel 130 to damage the support panel 130, only the support panel 130 may be separately replaced, such that a repairing cost of the carrier 100 for a vehicle is decreased.

In addition, in the case in which the front panel 110 and the support panel 130 are formed integrally with each other, an additional strength reinforcing component is required in order to reinforce strength of a coupling part of the support panel 130 and the front panel 110. However, since the support panel 130 is coupled through the bumper beam plate 151, a coupling structure is simplified.

Hereinafter, detailed coupling structures of the front panel 110, the support panel 130, and the bumper beam plate 151 will be described in detail with reference to the accompanying drawings.

Figure 6:
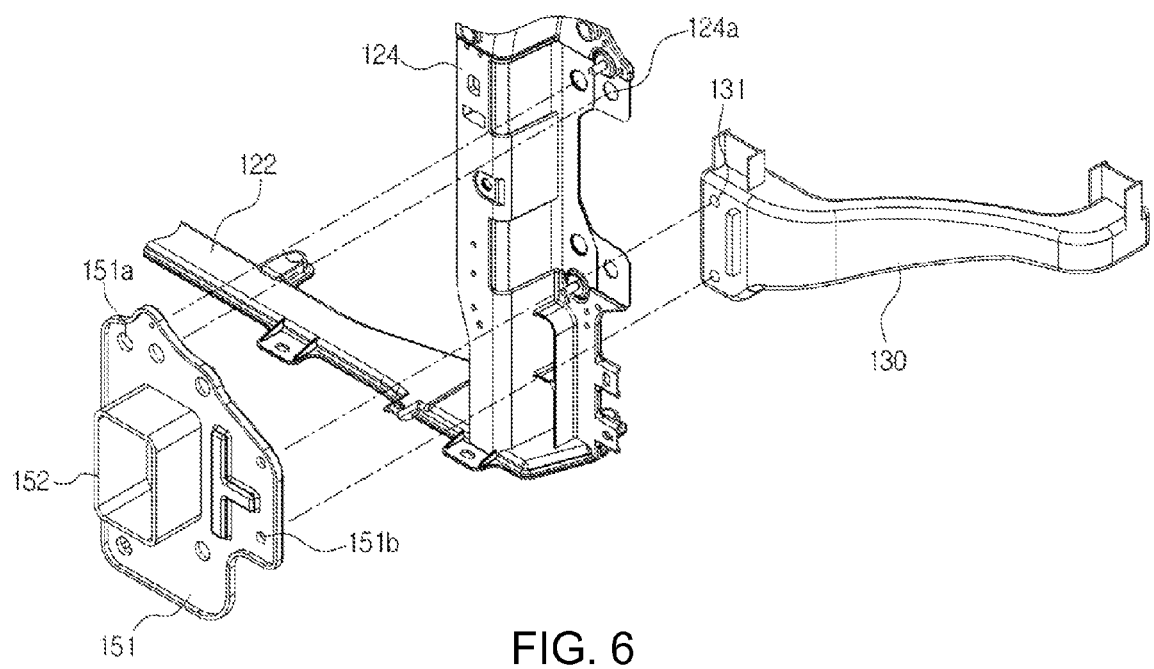
FIG. 6 is an enlarged exploded perspective view of main coupling parts of the carrier for a vehicle according to a first exemplary embodiment of the present invention.
Figure 7:
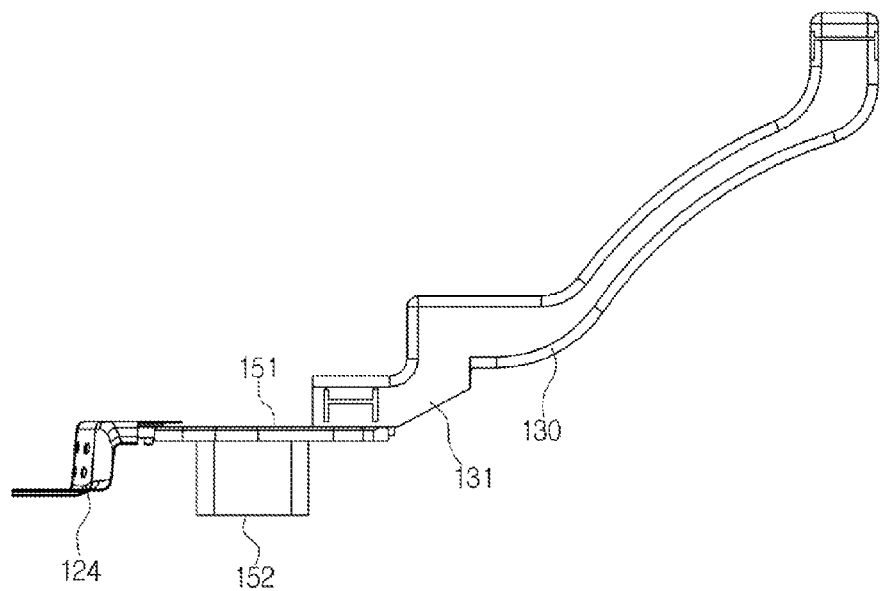
FIG. 7 is a plan view of the main coupling parts of the carrier for a vehicle according to a first exemplary embodiment of the present invention.

In FIG. 6, an enlarged exploded perspective view of main coupling parts of the carrier 100 for a vehicle according to a first exemplary embodiment of the present invention is illustrated, and in FIG. 7, a plan view of the main coupling parts of the carrier 100 for a vehicle according to a first exemplary embodiment of the present invention is illustrated.

Although only coupling structures of the right vertical support part 124, the bumper beam plate 151, and the support panel 130 are illustrated in FIGS. 6 and 7, since coupling structures of the left vertical support part 123, the bumper beam plate 151, and the support panel 130 are same as or similar to those of the right vertical support part 124, the bumper beam plate 151, and the support panel 130 except for a direction, a detailed description for the coupling structures of the left vertical support part 123, the bumper beam plate 151, and the support panel 130 will be omitted.

As illustrated in FIG. 6, the right vertical support part 124 includes first bumper beam plate coupling parts 124a formed at an outer side thereof in the width direction of the vehicle so as to be coupled to the bumper beam plate 151. The first bumper beam plate coupling part 124a may be formed of a general coupling hole for screw or bolt assembling. The bumper beam plate 151 includes first coupling parts 151a formed at an inner side thereof in the width direction of the vehicle and coupled to the first bumper beam plate coupling parts 124a, and includes second coupling parts 151b formed at an outer side thereof in the width direction of the vehicle so as to be coupled to the support panel 130. The first and second coupling parts 151a and 151b may be formed of a general coupling hole for screw or bolt assembling. Here, a plurality of second coupling parts 151b may be disposed to be spaced apart from each other in a vertical direction. This is to increase rigidity of coupling with the support panel 130 and allow the support panel 130 to be easily separated at the time of collision of the vehicle to prevent impact from being transferred to the right vertical support part 124. The support panel 130 includes second bumper beam plate coupling parts 131 formed at an inner side thereof in the width direction of the vehicle so as to be coupled to the second coupling parts 151b. The second bumper beam plate coupling part 131 may be formed of a general coupling hole for screw or bolt assembling. Here, a plurality of second bumper beam plate coupling parts 131 may be disposed to be spaced apart from each other in the vertical direction, due to the above-mentioned reason.

Through the configuration as described above, the support panel 130 is disposed at an outer side of the right vertical support part 124 in the width direction of the vehicle so as to be spaced apart from the right vertical support part 124 by a predetermined distance, and is coupled and fixed to the front panel 110 through the bumper beam plate 151.

Second Exemplary Embodiment

Hereinafter, a carrier for a vehicle according to a second exemplary embodiment of the present invention will be described in detail with reference to the accompanying drawings.

Figure 8:
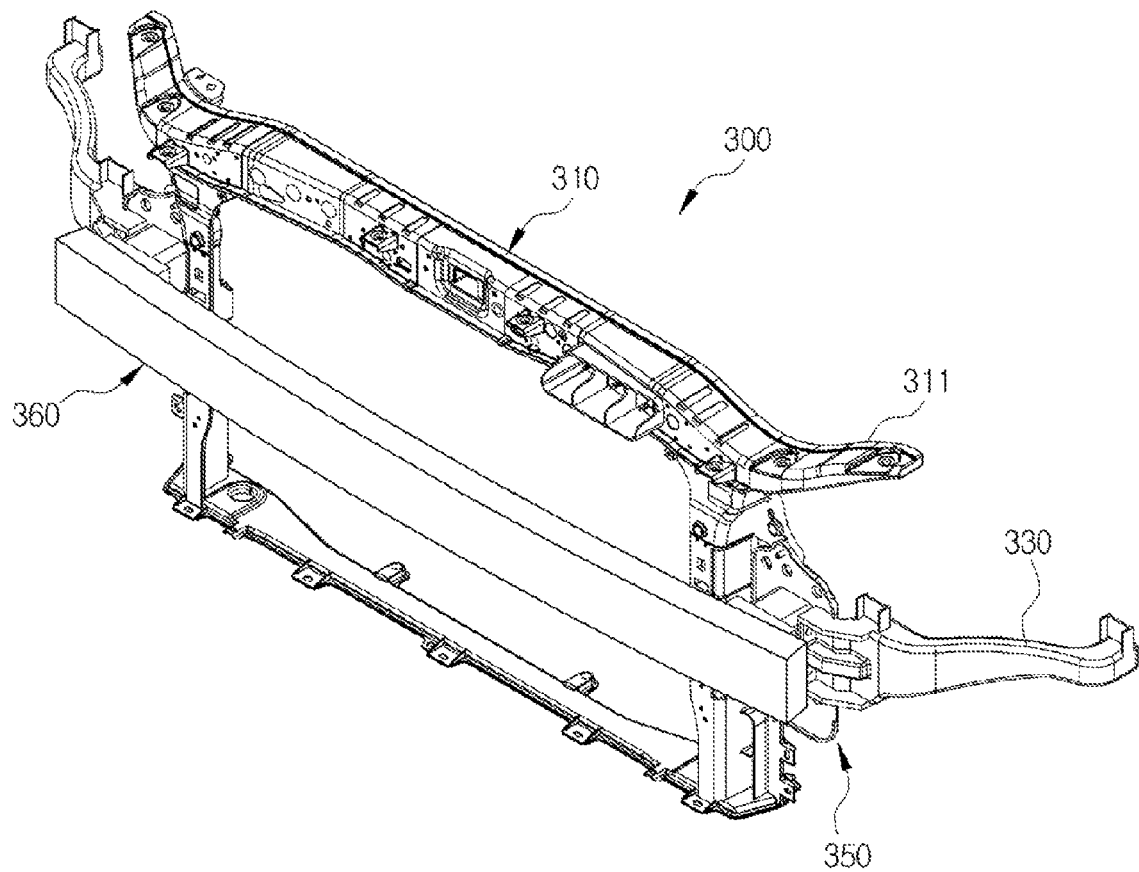
FIG. 8 is a perspective view of a carrier for a vehicle according to a second exemplary embodiment of the present invention.
Figure 9:
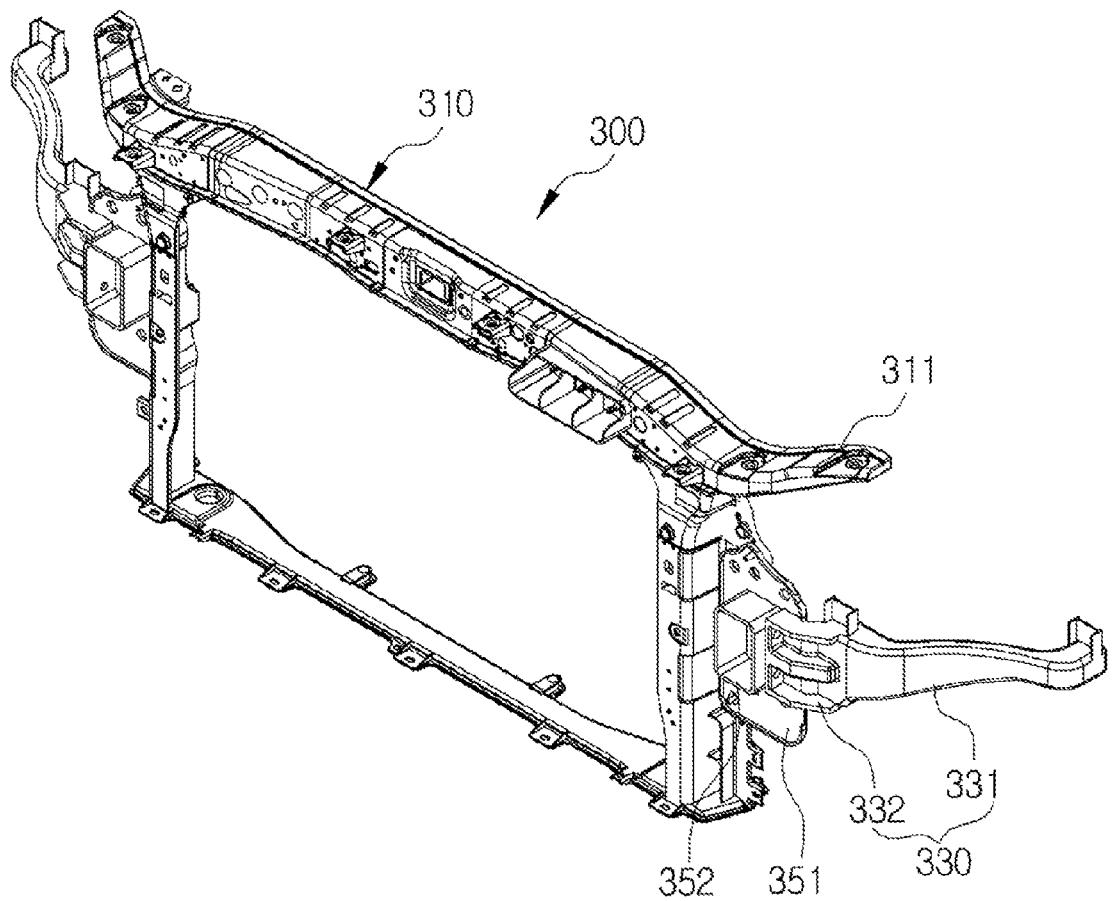
FIG. 9 is a perspective view of the carrier for a vehicle according to a second exemplary embodiment of the present invention from which a bumper beam is removed.

In FIG. 8, an entire perspective view of a carrier 300 for a vehicle according to a second exemplary embodiment of the present invention is illustrated, and in FIG. 9, an entire perspective view of the carrier 300 for a vehicle according to a second exemplary embodiment of the present invention from which a bumper beam 360 is removed is illustrated. In addition, in FIG. 10, an exploded perspective view of the carrier 300 for a vehicle according to a second exemplary embodiment of the present invention is illustrated.

As illustrated in FIGS. 8 and 9, the carrier 300 for a vehicle according to a second exemplary embodiment of the present invention is configured to include a front panel 310 including an upper horizontal support part 321, a lower horizontal support part 322 disposed in parallel with the upper horizontal support part 321 below the upper horizontal support part 321, and left and right vertical support parts 323 and 324 connecting the upper horizontal support part 321 and the lower horizontal support part 322 to each other to thereby be provided with a cooling module mounting part and having an approximately quadrangular frame shape; support panels 330 disposed at the left and the right of the front panel 310 in order to mount head lamps; a bumper beam 360 disposed in front of the front panel 310 so as to transverse in a width direction of the vehicle; and bumper beam brackets 350 disposed at the left and the right of the front panel 310 and formed in order to mount the bumper beam 360 at the front panel 310.

The support panels are generally formed to enclose circumferences of the head lamps. However, in accordance with the trend toward gradual miniaturization and lightness of the carrier, the support panels 330 of the carrier 300 for a vehicle according to a second exemplary embodiment of the present invention are configured to support only lower portions of the head lamps, and upper portions of the head lamps are supported through upper head lamp fixing parts 311 extended from both ends of the upper horizontal support part 321 outwardly in the width direction of the vehicle.

Here, in the case in which impact is applied to the head lamp at the time of front collision of the vehicle, the case in which the impact is transferred to the front panel 310 through the support panel 330 to damage the front panel 310 occurs. Therefore, even though only the support panel 330 is damaged, the support panel 330 and the front panel 310 are formed integrally with each other in many cases, such that the entire carrier 300 needs to be replaced, which is a burden. In consideration of this point, the carrier 300 for a vehicle according to a second embodiment of the present invention has the following characteristic configurations.

Figure 10:
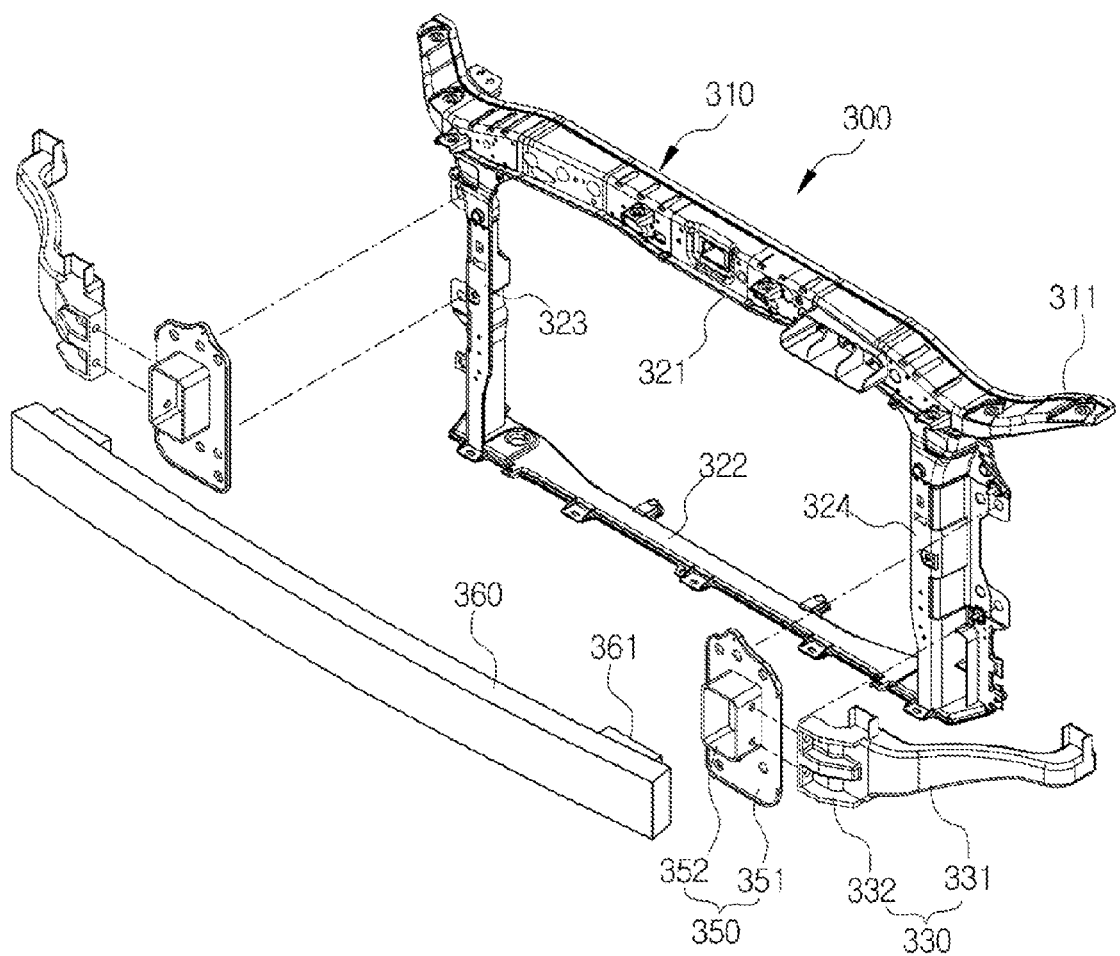
FIG. 10 is an exploded perspective view of the carrier for a vehicle according to a second exemplary embodiment of the present invention.

Referring to FIG. 10, the support panels 330 may be provided at an outer side of the left vertical support part 323 in the width direction of the vehicle and an outer side of the right vertical support part 324 in the width direction of the vehicle, respectively. Here, the support panels 330 are not formed integrally with the left vertical support part 323 or the right vertical support part 324, but may be formed separately from the left vertical support part 323 or the right vertical support part 324. In addition, the support panels 330 are not coupled directly to the left vertical support part 323 or the right vertical support part 324, but may be coupled and fixed to the left vertical support part 323 or the right vertical support part 324 through the bumper beam brackets 350 each coupled to the left vertical support part 323 and the right vertical support part 324 in order to couple the bumper beam 360 to the front panel 310. Therefore, the support panel 330 may include a head lamp mounting part 331 formed at an outer side thereof in the width direction of the vehicle in order to mount the head lamp, and a bracket coupling part 332 formed at an inner side thereof in the width direction of the vehicle so as to be coupled to the bumper beam bracket 350.

That is, an inner side of the bumper beam bracket 350 in the width direction of the vehicle may be coupled and fixed to an outer side of the left vertical support part 323 or the right vertical support part 324 in the width direction of the vehicle, and an inner side of the bracket coupling part 332 in the width direction of the vehicle may be coupled and fixed to an outer side of the bumper beam bracket 350 in the width direction of the vehicle.

Therefore, the impact applied to the support panel 330 is absorbed through the bumper beam bracket 350, such that it is not transferred directly to the left vertical support part 323 or the right vertical support part 324, thereby minimizing damage to the front panel 310, and even though the impact is applied to the support panel 330 to damage the support panel 330, only the support panel 330 may be separately replaced, such that a repairing cost of the carrier 300 for a vehicle is decreased.

In addition, in the case in which the front panel 310 and the support panel 330 are formed integrally with each other, an additional strength reinforcing component is required in order to reinforce strength of a coupling part of the support panel 330 and the front panel 310. However, since the support panel 330 is coupled through the bumper beam bracket 350, a coupling structure is simplified.

In addition, the bumper beam brackets 350 include bumper beam plates 351 formed in the width direction of the vehicle and having inner sides in the width direction of the vehicle fixed to the left vertical support part 323 or the right vertical support part 324 and bumper beam stays 352 extended from a vehicle front surface of the bumper beam plates 351 toward the front of the vehicle so that both ends of the bumper beam 360 are fixed thereto and having a beam shape.

Hereinafter, detailed coupling structures of the support panel 330 and the bumper beam bracket 350 will be described in detail with reference to the accompanying drawings.

Figure 11:
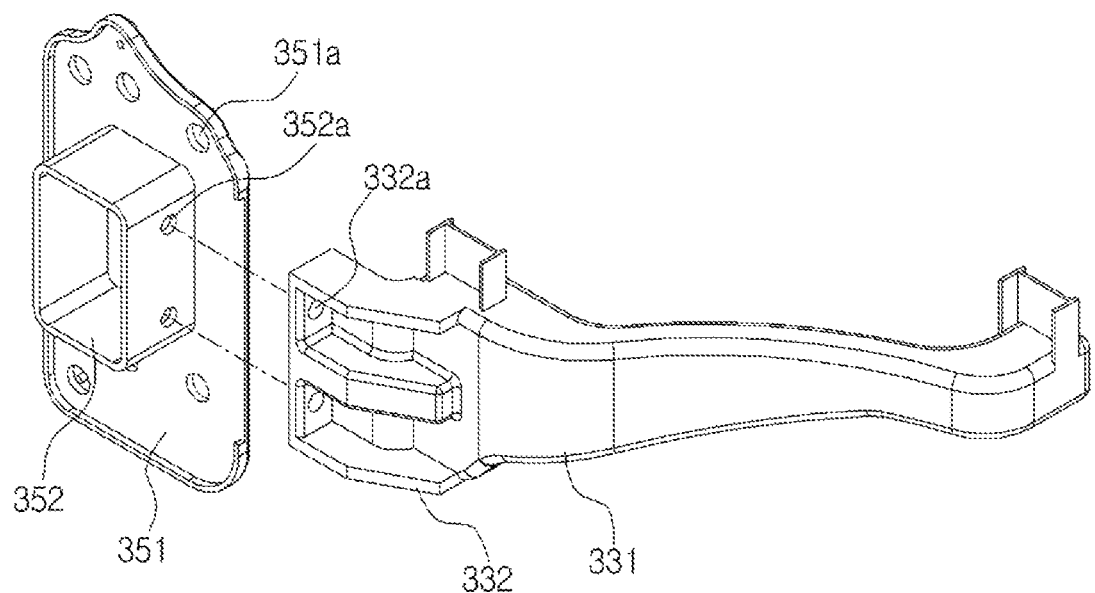
FIG. 11 is an enlarged exploded perspective view of main coupling parts of the carrier for a vehicle according to a second exemplary embodiment of the present invention.
Figure 12:
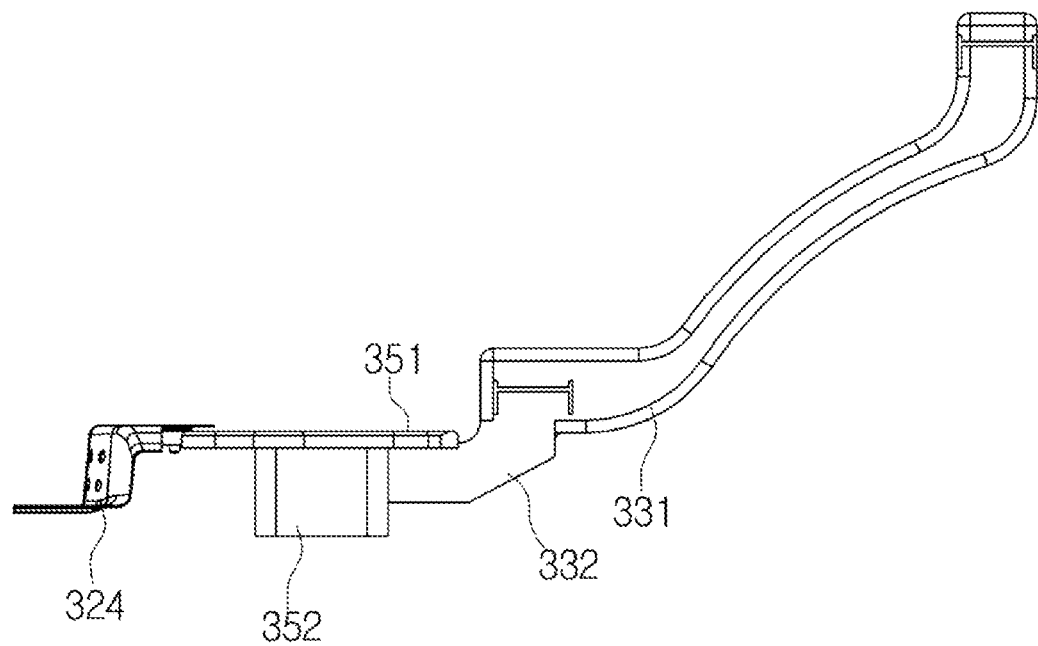
FIG. 12 is a plan view of the main coupling parts of the carrier for a vehicle according to a second exemplary embodiment of the present invention.

In FIG. 11, an enlarged exploded perspective view of main coupling parts of the carrier 300 for a vehicle according to a second exemplary embodiment of the present invention is illustrated, and in FIG. 12, a plan view of the main coupling parts of the carrier 300 for a vehicle according to a second exemplary embodiment of the present invention is illustrated.

Although only coupling structures of the right vertical support part 324, the bumper beam bracket 350, and the support panel 330 are illustrated in FIGS. 11 and 12, since coupling structures of the left vertical support part 323, the bumper beam bracket 350, and the support panel 330 are same as or similar to those of the right vertical support part 324, the bumper beam bracket 350, and the support panel 330 except for a direction, a detailed description for the coupling structures of the left vertical support part 323, the bumper beam bracket 350, and the support panel 330 will be omitted.

As illustrated in FIGS. 11 and 12, the bumper beam bracket 350 includes a bumper beam plate 351 and a bumper beam stay 352, and the bumper beam plate 351 includes first coupling parts 351a formed at an inner side thereof in the width direction of the vehicle so as to be coupled to the right vertical support part 324. The first coupling part 351a may be formed of a general coupling hole for screw or bolt assembling. Here, coupling parts of the bumper beam bracket 350 for being coupled to the support panel 330 are not formed in the bumper beam plate 351, but may be formed in the bumper beam stay 352. The reason is that an outer side of the bumper beam plate 351 in the width direction of the vehicle may be bent toward the front of the vehicle due to thermal deformation when the bumper beam plate 351 is welded and bonded to the bumper beam stay 352 so as to be coupled to the bumper beam stay 352 and in the case in which the support panel is coupled in this state, an outer side of the support panel in the width direction of the vehicle is also deformed toward the front of the vehicle and assembled, such that appearance quality may be deteriorated at the time of mounting the head lamp. Therefore, second coupling parts 352a for being coupled to the support panel 330 are formed in the bumper beam stay 352 in which the possibility that thermal deformation will be generated is relatively low, thereby making it possible to improve assembling quality at the time of coupling the support panel 330 to the bumper beam bracket 350. The second coupling parts 352a may be formed in an inner side surface of the bumper beam stay 352 in the width direction of the vehicle, and be formed of a general coupling hole for screw or bolt assembling. Here, a plurality of second coupling parts 351b may be disposed to be spaced apart from each other in a vertical direction. This is to increase rigidity of coupling with the support panel 330 and allow the support panel 330 to be easily separated at the time of collision of the vehicle to prevent impact from being transferred to the right vertical support part 324.

The support panel 330 includes a bracket coupling part 332 formed at an inner side thereof in the width direction of the vehicle, and the bracket coupling part 332 includes bumper beam stay coupling parts 332a formed in an inner side surface thereof in the width direction of the vehicle so as to be screw or bolt-coupled to the second coupling parts 352a. The bumper beam stay coupling part 332a may be formed of a general coupling hole for screw or bolt assembling. Here, a plurality of bumper beam stay coupling parts 332a may be disposed to be spaced apart from each other in the vertical direction, due to the above-mentioned reason.

In addition, a vehicle rear surface of the bracket coupling part 332 is configured to contact a front surface of the bumper beam plate 351 to firmly fix the support panel 330 to the bumper beam bracket 350.

Through the configuration as described above, the support panel 330 is disposed at an outer side of the right vertical support part 324 so as to be spaced apart from the right vertical support part 324 by a predetermined distance, and is coupled and fixed to the front panel 310 through the bumper beam bracket 350.

In the carrier for a vehicle according to an exemplary embodiment of the present invention having the configuration as described above, the support panels are formed to be separated from the carrier. Therefore, when the impact is applied to the head lamp, the impact is not transferred to the front panel, such that a repairing cost due to damage to the carrier may be decreased. In addition, when the support panel is damaged, only the support panel may be replaced without replacing the entire carrier, such that a repairing cost due to replacement of the carrier may be decreased.

Further, a structure for reinforcing strength of the support panel is removed, such that an entire weight of the carrier is decreased, thereby improving fuel efficiency performance of the vehicle and decreasing a manufacturing cost.

Further, a structure of the carrier is simplified, such that deformation of the carrier is minimized at the time of injection-molding the carrier.

Furthermore, the support panel is coupled to the stay of the bumper beam in which deformation is not generated, such that deterioration of assembling quality due to deformation of a support panel coupling part on the bumper beam is prevented, thereby improving appearance quality of the head lamp coupled to the support panel.

The spirit and the scope of the present invention should not be construed to being limited to the above-mentioned exemplary embodiments. The present invention may be applied to various fields and may be variously modified by those skilled in the art without departing from the scope of the present invention claimed in the claims. Therefore, these alterations and modifications fall within the scope of the present invention.

What is claimed is:

1. A carrier for a vehicle, comprising:
   a front panel including an upper horizontal support part and a lower horizontal support part, a left vertical support part, and a right vertical support part connecting the upper and lower horizontal support parts to each other to thereby be provided with a cooling module mounting part and have a quadrangular shape;
   a first support panel disposed at the left of the front panel and a second support panel disposed at the right of the front panel in order to mount head lamps; and
   a bumper beam having a first end coupled to the left vertical support part and a second end coupled to the right vertical support part,
   wherein the first support panel is coupled and fixed to the first end of the bumper beam and the second support panel is coupled and fixed to the second end of the bumper beam,
   wherein the carrier further comprises a first bumper beam bracket configured to couple the first end of the bumper beam to the left vertical support part and a second bumper beam bracket configured to couple the second end of the bumper beam to the right vertical support part, respectively, wherein the first support panel is coupled and fixed to the first bumper beam bracket and the second support panel is coupled and fixed to the second bumper beam bracket, respectively, wherein each of the first bumper beam bracket and the second bumper beam bracket includes: a bumper beam plate formed in a width direction of the vehicle and having an inner side in the width direction of the vehicle, the inner side fixed to one of the left vertical support part and the right vertical support part; and a bumper beam stay extended from a vehicle front surface of the bumper beam plate toward the front of the vehicle, wherein the bumper beam is fixed to the bumper beam stay, wherein one of the first support panel and the second support panel is coupled and fixed to a rear surface of the bumper beam plate, wherein the first support panel is coupled and fixed to a first one of the bumper beam plates and the second support panel is coupled and fixed to a second one of the bumper beam plates, and wherein the first support panel is spaced apart from the left vertical support part and the second support panel is spaced apart from the right vertical support part outwardly in the width direction of the vehicle by a predetermined distance.

2. The carrier for a vehicle of claim 1, wherein each of the first bumper beam plate and the second bumper beam plate includes first coupling parts formed at an inner side thereof in the width direction of the vehicle, the first coupling parts of the first bumper beam plate coupled to the left vertical support part and the first coupling parts of the second bumper beam plate coupled to the right vertical support part, wherein each of the first bumper beam plate and the second bumper beam plate includes second coupling parts formed at an outer side thereof in the width direction of the vehicle, the second coupling parts of the first bumper beam plate coupled to the first support panel and the second coupling parts of the second bumper beam plate coupled to the second support panel.

3. The carrier for a vehicle of claim 2, wherein the second coupling parts are formed of holes for bolt or screw coupling, and the second coupling parts are formed to be spaced apart from each other in a vertical length direction.

4. The carrier for a vehicle of claim 2, wherein the left vertical support part and the right vertical support part include first bumper beam plate coupling parts formed at outer sides thereof in the width direction of the vehicle so as to be coupled to the first coupling parts.

5. The carrier for a vehicle of claim 1, wherein each of the first bumper beam plate and the second bumper beam plate includes first coupling parts formed at an inner side thereof in the width direction of the vehicle, the first coupling parts of a first bumper beam plate coupled to the left vertical support part and the first coupling parts of a second bumper beam plate coupled to the right vertical support part, wherein each of the first bumper beam plate and the second bumper beam plate includes second coupling parts formed at an outer side thereof in the width direction of the vehicle, the second coupling parts of the first bumper beam plate coupled to the first support panel and the second coupling parts of the second bumper beam plate coupled to the second support panel.

6. The carrier for a vehicle of claim 5, wherein the second coupling parts are formed of holes for bolt or screw coupling, and the second coupling parts are formed to be spaced apart from each other in a vertical length direction.

7. The carrier for a vehicle of claim 5, wherein the left vertical support part and the right vertical support part include first bumper beam plate coupling parts formed at outer sides thereof in the width direction of the vehicle so as to be coupled to the first coupling parts.

8. A carrier for a vehicle, comprising:
a front panel including an upper horizontal support part and a lower horizontal support part, a left vertical support part, and a right vertical support part connecting the upper and lower horizontal support parts to each other to thereby be provided with a cooling module mounting part and have a quadrangular shape;
a first support panel disposed at the left of the front panel and a second support panel disposed at the right of the front panel in order to mount head lamps; and
a bumper beam having a first end coupled to the left vertical support part and a second end coupled to the right vertical support part,
wherein the first support panel is coupled and fixed to the first end of the bumper beam and the second support panel is coupled and fixed to the second end of the bumper beam,
wherein the carrier further comprises a first bumper beam bracket configured to couple the first end of the bumper beam to the left vertical support part and a second bumper beam bracket configured to couple the second end of the bumper beam to the right vertical support part, respectively,
wherein each of the first bumper beam bracket and the second bumper beam bracket includes: a bumper beam plate formed in a width direction of the vehicle and having an inner side in the width direction of the vehicle, the inner side fixed to one of the left vertical support part and the right vertical support part; and a bumper beam stay extended from a vehicle front surface of the bumper beam plate toward the front of the vehicle,
wherein the bumper beam is fixed to the bumper beam stay, and
wherein one of the first support panel and the second support panel is coupled and fixed to an outer side surface of the bumper beam stay in the width direction of the vehicle.

9. The carrier for a vehicle of claim 8, wherein the first support panel is coupled and fixed to the first bumper beam bracket wherein the first support panel is coupled to and spaced apart from the left vertical support part, and the second support panel is coupled and fixed to the second bumper beam bracket wherein the second support panel is spaced apart from the right vertical support part outwardly in the width direction of the vehicle by a predetermined distance.

10. The carrier for a vehicle of claim 8, wherein each of the first bumper beam plate and the second bumper beam plate further includes first coupling parts formed at an inner side thereof in the width direction of the vehicle, the first coupling parts configured to be coupled to one of the left vertical support part and the right vertical support part; and
wherein the bumper beam stays include second coupling parts formed at an outer side thereof in the width direction of the vehicle, the second coupling parts configured to be coupled to the support panels.

11. The carrier for a vehicle of claim 10, wherein the second coupling parts are formed of holes for bolt or screw coupling, and the second coupling parts are formed to be spaced apart from each other in a vertical length direction.

12. The carrier for a vehicle of claim 10, wherein at least one of the first support panel and the second support panel includes:
   a head lamp mounting part formed at an outer side thereof in the width direction of the vehicle in order to mount the head lamp; and
   a bracket coupling part formed at an inner side thereof in the width direction of the vehicle so as to be coupled to the bumper beam bracket,
   wherein the bracket coupling part includes bumper beam stay coupling parts formed at an inner side thereof in the width direction of the vehicle so as to be screw or bolt-coupled to the second coupling parts.

13. The carrier for a vehicle of claim 8, wherein each of the first bumper beam plate and the second bumper beam plate further includes first coupling parts formed at an inner side thereof in the width direction of the vehicle, the first coupling parts configured to be coupled to the left vertical support part or the right vertical support part, and
   wherein the bumper beam stays include second coupling parts formed at an outer side thereof in the width direction of the vehicle, the second coupling parts configured to be coupled to the support panels.

14. The carrier for a vehicle of claim 13, wherein the second coupling parts are formed of holes for bolt or screw coupling, and the second coupling parts are formed to be spaced apart from each other in a vertical length direction.

15. The carrier for a vehicle of claim 13, wherein the support panel includes:
   a head lamp mounting part formed at an outer side thereof in the width direction of the vehicle in order to mount the head lamp; and
   a bracket coupling part formed at an inner side thereof in the width direction of the vehicle so as to be coupled to the bumper beam bracket, and
   the bracket coupling part includes bumper beam stay coupling parts formed at an inner side thereof in the width direction of the vehicle so as to be screw or bolt-coupled to the second coupling parts.

16. The carrier for a vehicle of claim 15, wherein a vehicle rear surface of the bracket coupling part contacts a vehicle front surface of the bumper beam plate.

17. The carrier for a vehicle of claim 16, wherein a vehicle rear surface of the bracket coupling part contacts a vehicle front surface of the bumper beam plate.

* * * * *